(12) United States Patent
Choi et al.

(10) Patent No.: US 7,676,007 B1
(45) Date of Patent: Mar. 9, 2010

(54) SYSTEM AND METHOD FOR INTERPOLATION BASED TRANSMIT BEAMFORMING FOR MIMO-OFDM WITH PARTIAL FEEDBACK

(76) Inventors: Jihoon Choi, Kweonsun-gu, Kweonsun-dong, 1295-4, #206, Suweon City, Kyung-gi Province (KR) 441-885; Robert W. Heath, Jr., 9701 Beauchamp Sq., Austin, TX (US) 78729

( * ) Notice: Subject to any disclaimer, the term of this patent is extended or adjusted under 35 U.S.C. 154(b) by 1135 days.

(21) Appl. No.: 11/188,233

(22) Filed: Jul. 21, 2005

Related U.S. Application Data

(60) Provisional application No. 60/589,713, filed on Jul. 21, 2004.

(51) Int. Cl.
*H04B 7/08* (2006.01)

(52) U.S. Cl. .................. 375/347; 375/299; 375/267; 455/101; 455/132; 455/500; 455/296; 455/69

(58) Field of Classification Search ............... 375/267, 375/340
See application file for complete search history.

(56) References Cited

U.S. PATENT DOCUMENTS

| | | | | |
|---|---|---|---|---|
| 7,245,881 B2 * | 7/2007 | Sugar et al. | ................ | 455/69 |
| 2004/0178954 A1 * | 9/2004 | Vook et al. | ................ | 342/383 |
| 2005/0287978 A1 * | 12/2005 | Maltsev et al. | ............. | 455/403 |

OTHER PUBLICATIONS

David J. Love et al "What is the value of Limited Feedback for MIMO Channels", Department of Electrical and Computer Engineering, Jun. 2004.*

David J. Love et al "Limited Feedback Precoding for Spatial Multiplexing Systems" IEEE 2003.*

Robert W. Heath Jr. et al "A Simple Scheme for Transmit Diversity Using Partial Channel Feedback", IEEE 1998.*

Spherical Averages and Applications to Spherical Splines and Interpolation by Samuel R. Buss.*

M. J. Narala, M.D. Trott and G. W. Wornelli, Efficient use of side information in multiple-antenna data transmission over fading channels, IEEE J. Sel. Areas Commun., Oct. 1998, pp. 1423-1436, vol. 16, No. 8.

J. Love, R. W. Heath Jr and T. Strohmer, Grassmannian beamforming for multiple-input multiple-output wireless systems, IEEE Trans. Inf. Theory, Oct. 2003, pp. 2735-2747, vol. 49, No. 10.

K Mukkavilli, A. Sabharwal, E. Erkip and B. Aazhang, On beamforming with finite rate feedback in multiple-antenna systems, IEEE Trans. Inf. Theory, Oct. 2003, pp. 2562-2579, vol. 49, No. 10.

* cited by examiner

*Primary Examiner*—David C Payne
*Assistant Examiner*—Leon Flores
(74) *Attorney, Agent, or Firm*—Schwabe, Williamson & Wyatt P.C.

(57) ABSTRACT

Transmit beamforming with receive combining uses the significant diversity provided by multiple-input multiple-output (MIMO) systems, and the use of orthogonal frequency division multiplexing (OFDM) enables low complexity implementation of this scheme over frequency selective MIMO channels. Optimal beamforming uses channel state information in the form of the beamforming vectors corresponding to all the OFDM subcarriers. In non-reciprocal channels, this information should be conveyed back to the transmitter. To reduce the amount of feedback information, transmit beamforming combines limited feedback and beamformer interpolation. In this architecture, the receiver sends back a fraction of information about the beamforming vectors to the transmitter, and the transmitter computes the beamforming vectors for all subcarriers through interpolation of the conveyed beamforming vectors. Since a beamforming vector is phase invariant and has unit norm, a linear spherical interpolator uses additional parameters for phase rotation. These parameters are determined at the receiver in the sense of maximizing the minimum channel gain or capacity. The interpolator maybe combined with beamformer quantization.

43 Claims, 6 Drawing Sheets

SYSTEM AND METHOD FOR INTERPOLATION BASED TRANSMIT BEAMFORMING FOR MIMO-OFDM WITH PARTIAL FEEDBACK

CROSS-REFERENCE TO RELATED APPLICATION

This application claims priority from, and the benefit of, U.S. Provisional Patent Application Ser. No. 60/589,713, entitled "System and Method for Interpolation Based Transmit Beamforming for MIMO-OFDM with Partial Feedback", filed on Jul. 21, 2004, the contents of which are expressly incorporated herein by reference in their entirety.

TECHNICAL FIELD

This application relates to a multiple input multiple output system using orthogonal frequency division multiplexing, and more particularly, to systems using partial feedback for interpolation based transmit beamforming.

BACKGROUND

Multiple-input multiple-output (MIMO) systems include multiple transmit antennas and multiple receive antennas. MIMO systems provide improved reliability over fading channels, because the increased dimension of a MIMO system may be used to mitigate signal-level fluctuations. Transmit beamforming with receive combining is a method to exploit the diversity offered by MIMO systems. The beamforming techniques for narrowband channels may be extended to frequency selective MIMO channels by employing orthogonal frequency division multiplexing (OFDM). The use of MIMO technology in combination with OFDM, e.g., "MIMO-OFDM," converts a broadband MIMO channel into multiple narrowband MIMO channels corresponding to OFDM subcarriers.

SUMMARY

A communication system comprises a transmitter and a receiver. The transmitter provides orthogonal frequency division multiplexing to a plurality of first signals and provides the signals on a plurality of subcarriers. The transmitter includes a interpolator. The receiver receives the signals outputted from the transmitter and provides decoded signals indicative of the first signals, and provides beamforming vectors and interpolation parameters. The interpolator provides beamforming vectors in response to the beamforming vectors and interpolation parameters from the receiver.

In one aspect, the interpolator uses a phase rotation on the beamforming vectors. In another aspect, the phase rotation reduces distortion in the interpolation of the beamforming vectors. In another aspect, the phase rotation satisfies a closed-form solution. In another aspect, the interpolator quantizes the vectors using a code book.

In one aspect, the receiver subsamples the subcarriers, selects a portion of said subcarriers, evaluates the beamforming vectors corresponding to said selected subcarriers, and generates interpolation parameters from said evaluated beamforming vectors including said phase rotation.

DETAILED DESCRIPTION

Multiple-input multiple-output (MIMO) systems provide improved reliability over fading channels, because the increased dimension of a MIMO system may be used to mitigate signal-level fluctuations. Transmit beamforming with receive combining is a method to exploit the diversity offered by MIMO systems. The beamforming techniques for narrowband channels may be extended to frequency selective MIMO channels by employing orthogonal frequency division multiplexing (OFDM). The use of MIMO technology in combination with OFDM, e.g., "MIMO-OFDM," converts a broadband MIMO channel into multiple narrowband MIMO channels corresponding to OFDM subcarriers. When the uplink and downlink channel are not reciprocal, the transmitter of the MIMO-OFDM System uses the beamforming vector for each subcarrier. Thus, the feedback increases in proportion to the number of subcarriers.

To reduce the feedback parameters of the MIMO-OFDM System, a transmit beamforming system and method combines limited feedback of beamforming information and interpolation of beamforming vectors. Using the correlation between OFDM subcarriers, a receiver may select a fraction of subcarriers and send back the beamforming vectors for the selected subcarriers to the transmitter. The transmitter may evaluate the beamforming vectors for all the OFDM subcarriers through interpolation of the conveyed beamforming vectors. In one embodiment, the transmitter may include a spherical interpolator. In one embodiment, the spherical interpolator may employ a parameter for phase rotation which is determined to minimize the distortion induced by interpolation.

Figure 1:
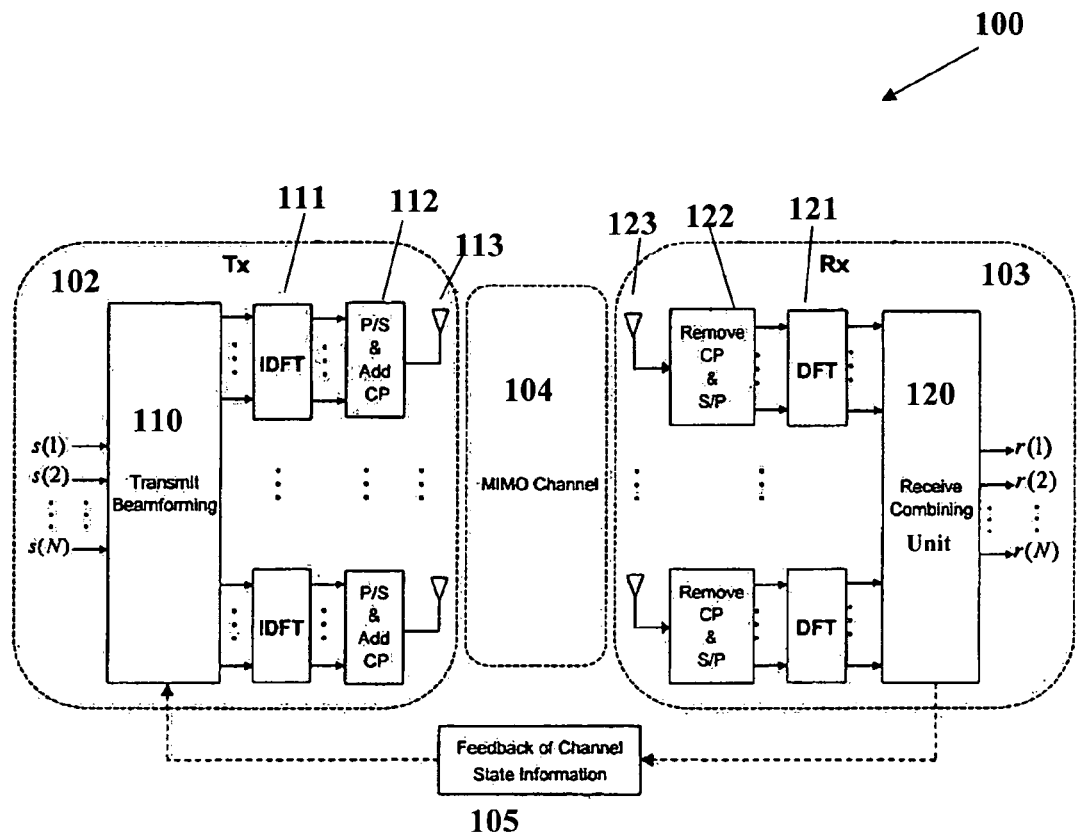
FIG. 1 is a block diagram illustrating a multiple-input multiple-output—orthogonal frequency division multiplex (MIMO-OFDM) communication system with transmit beamforming and receive combining.

FIG. 1 illustrates a MIMO-OFDM communication system 100 with transmit beamforming and receive combining. The MIMO-OFDM system 100 comprises a transmitter 102, a receiver 103, a communication channel 104, and a feedback network 105. The transmitter 302 (FIG. 3) and the receiver 400 (FIG. 4) may be used instead of the transmitter 102 and the receiver 103, respectively. The transmitter 102 comprises a transmit beamforming system 110, a plurality of inverse discrete Fourier transform (IDFT) units 111, a plurality of parallel to serial (P/S) & ADD Cyclic prefix (CP) units 112, and a plurality of transmit antennas 113. For simplicity and clarity, only one unit 111, one unit 112, and one antenna 113 are labeled with reference numbers in FIG. 1. The receiver 103 comprises a receive combining unit 120, a plurality of discrete Fourier transform (DFT) units 121, a plurality of remove CP & serial to parallel (S/P) units 122, and a plurality of received antennas 123. For simplicity and clarity, only one receive combining unit 120, one DFT processor 121, one S/P processor 122, and one receive antenna 123 are labeled with reference numbers in FIG. 1. In an illustrative example, the MIMO-OFDM system 100 comprises $M_r$ receive antennas 123, and N subcarriers. The numbers $M_t$ and $M_r$ may be randomly chosen and N is usually set as a power of two. The communication channel 104 may be frequency selective.

In an alternative embodiment, the system 100 may be modified for use in a multiple-input single-output (MISO) system. The MISO system may have a plurality of transmit antennas 113 and a single receive antenna 123. The communication channel 104 becomes a MISO channel.

After transmit beamforming and OFDM modulation, the symbols $\{s(1), s(2), \ldots, s(N)\}$ are simultaneously transmitted through $M_t$ antennas 113. At the receiver 103, the signal received through each receiver antenna 123 is demodulated by the discrete Fourier transform (DFT) processors 121 and combined to recover the transmitted symbols. The information about the beamforming vectors is conveyed to the transmitter 102 through the feedback channel 105 with limited rate.

Figure 2:
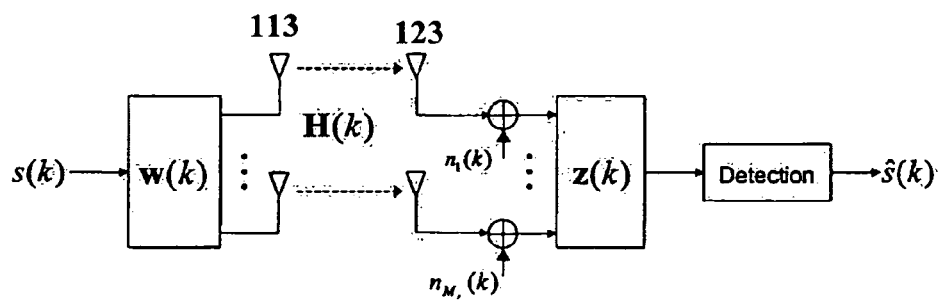
FIG. 2 is a block diagram illustrating an equivalent structure of the beamforming and combining at a sub carrier k of the MIMO-OFDM communication system of FIG. 1.

FIG. 2 shows an equivalent structure for beamforming and combining at subcarrier k. w(k) and z(k) denote the transmit beamforming vector and receive combining vector at subcarrier k, respectively. The symbol s(k) is mapped to the transmit antennas 113 by the beamforming vector w(k), and the signals obtained from the receive antennas 123 are combined by z(k). The transmit beamforming vector w(k) is an equivalent vector for the transmit beamforming unit 110, the IDFT units 111, and the CP units 112. The receive combining vector z(k) is an equivalent structure for the S/P units 122, the DFT units 121, and the receive combining unit 120.

Figure 3:
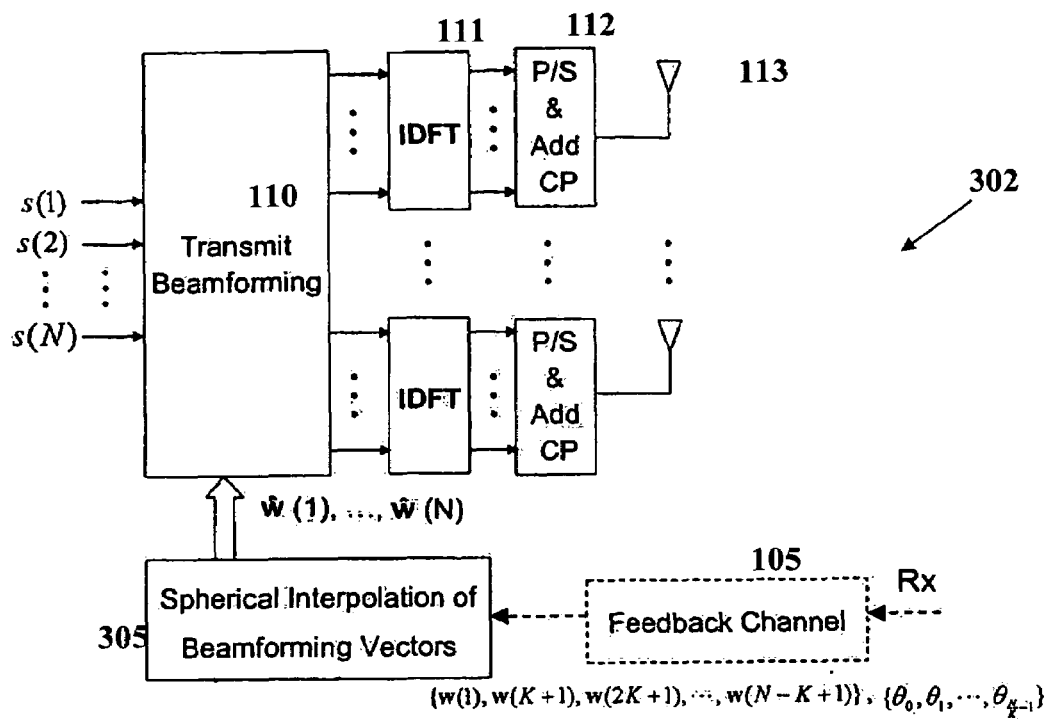
FIG. 3 is a block diagram illustrating a transmitter of the MIMO-OFDM communication system of FIG. 1.

FIG. 3 shows one embodiment of the MIMO-OFDM beamforming in a transmitter 302 according to the present invention. The transmitter 302 is similar to the transmitter 102 (FIG. 1) but includes a spherical interpolation of the beamforming vectors from the feedback channel 105. The transmitter 302 calculates the beamforming vectors for all the subcarriers using a fraction of beamforming vectors and the parameters for interpolation, which are available from the feedback channel 105 which the spherical interpolator 305 performs. The remaining blocks are the same as those for the MIMO-OFDM system 100 (FIG. 1). The $\{w(1) \ldots w(N)\}$ is the interpolated beamforming. The interpolation may use, for example, uniformly spaced carriers, nonuniform spaced carriers or quantized channel information. The operation of the transmitter 302 is described in more detail below.

Figure 4:
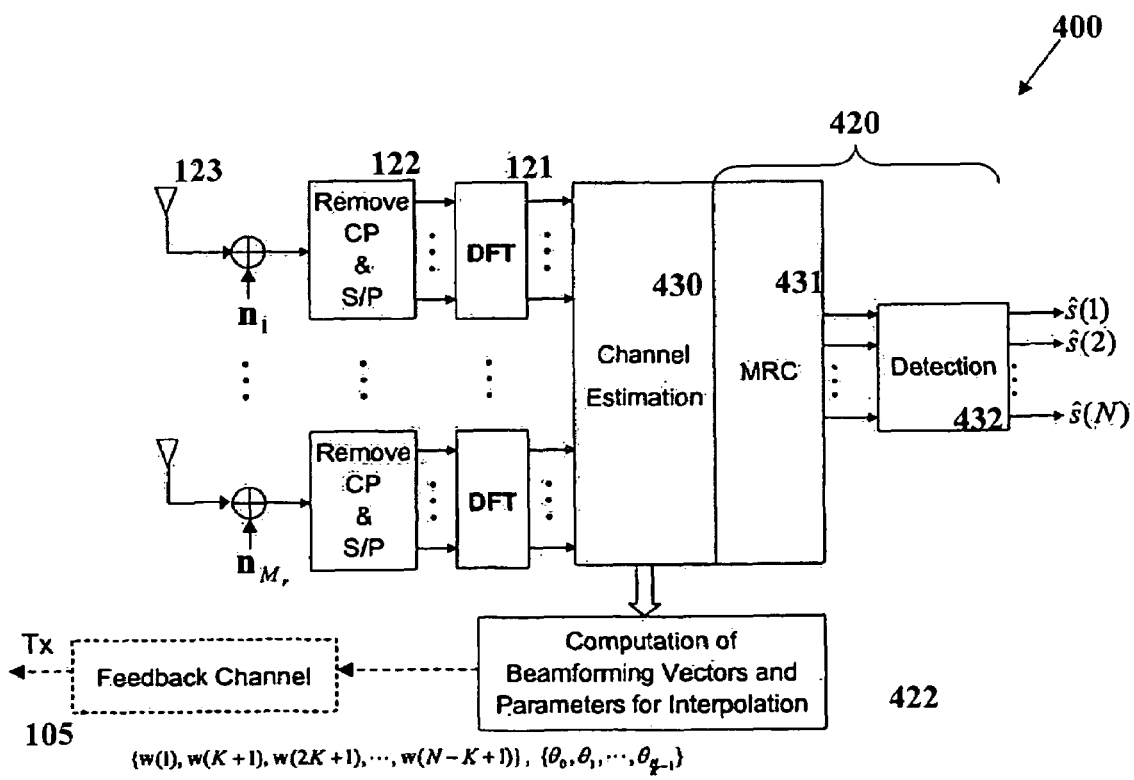
FIG. 4 is a block diagram illustrating a receiver of the MIMO-OFDM communication system of FIG. 1.

FIG. 4 illustrates one embodiment of a receiver 400 according to the present invention. The receiver 400 may be used instead of the receiver 103 in the system 100. The receiver 400 is similar to the receiver 103 but includes a receiving combining unit 420, and a beamforming vector and interpolation parameter unit 422. The receive combining unit 420 comprises a channel estimator 430, a maximum rate combining (MRC) unit 431, and a detector 432. After OFDM demodulation, the received signals from the $M_r$ antennas 123 and N subcarriers are used for channel estimation and maximum ratio combining (MRC). The MRC unit 431 executes an MRC for each subcarrier separately and the transmitted symbols are recovered from the combined signals. Using the estimated channel information, the optimal beamforming vectors used at the transmitter 302 are computed. The detector 432 may be, for example, a linear detector, a non-linear detector, a linear equalizer, a maximum likelihood sequencing detector, MMSE, a sphere decoder or other detectors well known in the art.

The receiver 400 subsamples the subcarriers, e.g., selects a fraction of subcarriers. Suppose that K is the subsampling rate which is usually set as a divisor of N. Then the receiver 400 evaluates the beamforming vectors for the selected subcarriers, $\{w(1), w(K+1), \ldots, w(N-K+1)\}$. In addition, the receiver 400 finds the parameters for phase rotation $$\{\theta_0, \theta_1, \ldots, \theta_{\frac{N}{K}-1}\}$$

minimizing the distortion induced by interpolation. The beamforming vectors are sent back to the transmitter 302 along with the parameters for phase rotation through the feedback channel 105. In another embodiment, the receiver 400 samples the subcarriers nonuniformly. The operation of the receiver 400 is described in more detail below.

Figure 5:
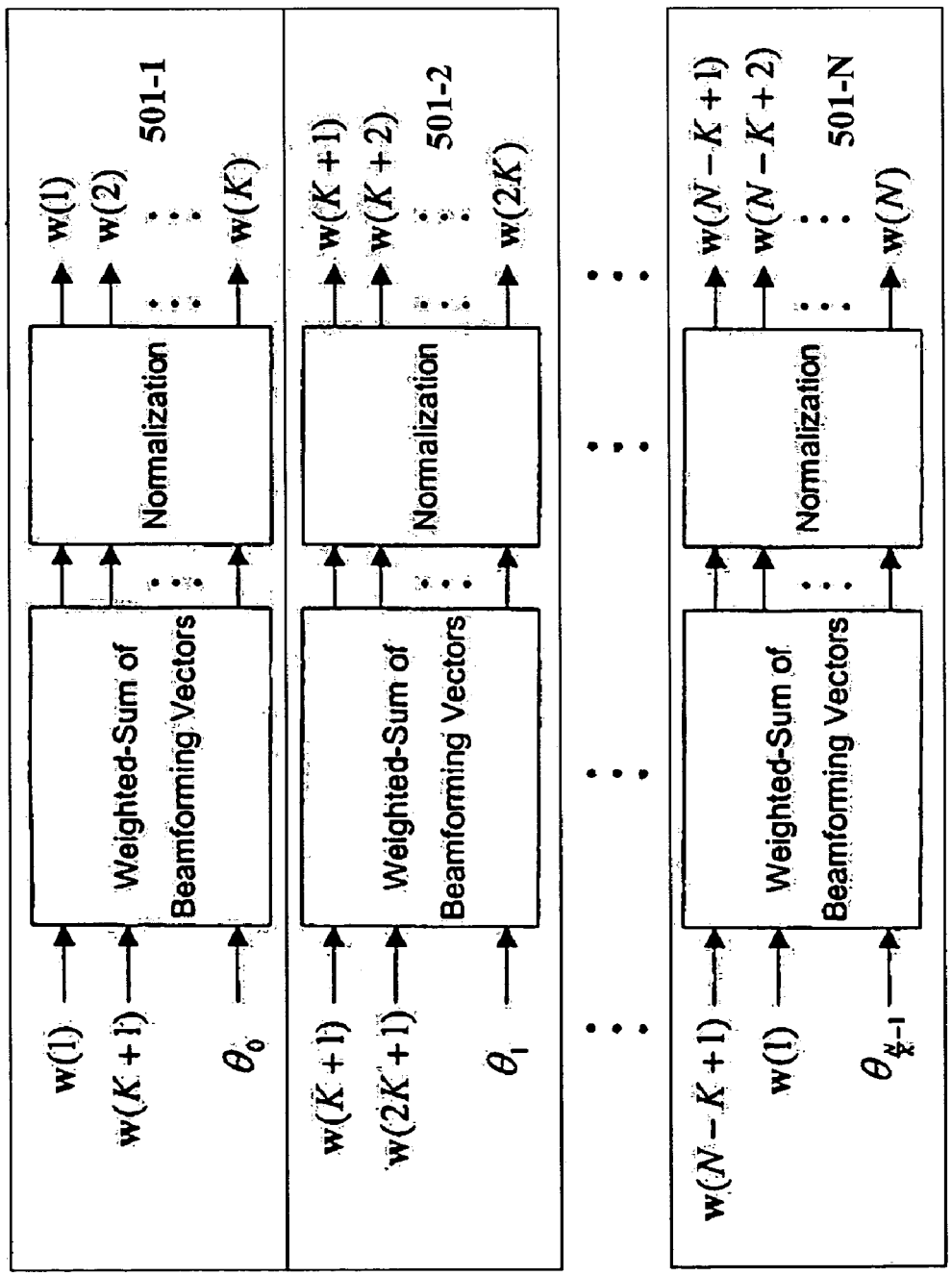
FIG. 5 is a block diagram illustrating a spherical interpolation scheme of the MIMO-OFDM communication system of FIG. 1.

FIG. 5 illustrates one embodiment of the spherical interpolator 305. The beamforming vectors are computed by blockwise interpolation in a plurality of interpolators 501-1 through 501-N. Each interpolator 501 includes a weighted sum unit 510 and a normalization unit 511. In a first interpolator 501-N of FIG. 5, $\{w(1), w(2), \ldots, w(K)\}$ are obtained from w(1), w(K+1), and $\theta_0$. Generally, $\{w(lK+1), w(lK+2), \ldots, w((l+1)K)\}$ are obtained from w(lK+1), w((l+1)K+1), and $\theta_1$. Using the periodicity of DFT, w(N−K+1), w(1)(=w(N+1)), and $$\theta_{\frac{N}{K}-1}$$

are used to evaluate $\{w(N-K+1), w(N-K+2), \ldots, w(N)\}$ in the last interpolator 501-N. The interpolated beamforming vectors $\{w(1), w(2), \ldots, w(N)\}$ are used for the transmit beamforming in the transmitter 302 (FIG. 3.)

MIMO-OFDM Systems with Limited Feedback

The MIMO-OFDM system 100 is now described in more detail. MIMO systems, which use multiple antennas at both transmitter and receiver, provide increased spectral efficiency or improved reliability over fading channels. A MIMO communication system offers a significant improvement in data rate through spatial multiplexing. Alternatively, the increased dimension of a MIMO system is used to mitigate signal-level fluctuations in fading channels. In narrowband fading channels, transmit beamforming with receive combining is a simple approach to achieving the full diversity order as well as additional array gain. In non-reciprocal channels (as in a frequency division duplexing system), this necessitates that the receiver sends back the channel state information in the form of the beamforming vector through a feedback channel with limited rate. A practical solution for reducing the feedback information is to use a codebook of possible beamforming vectors which is known to both the transmitter and receiver (see e.g., the references Narula, Love and R. W. Heath, Jr., and Mukkavilli references cited below in conjunction with the codebook.).

The beamforming techniques proposed for narrowband channels may be extended to frequency selective MIMO channels by employing OFDM. In a MIMO-OFDM system, a broadband MIMO channel is divided into a set of parallel narrowband MIMO channels, e.g., it converts a broadband MIMO channel into multiple narrowband MIMO channels. Thus transmit beamforming and receive combining may be performed independently for each subcarrier. In non-reciprocal channels, the MIMO-OFDM receiver sends back the beamforming vectors for all the OFDM subcarriers to the transmitter. To transmit beamforming vectors through a feedback channel with limited data rate, we may quantize each beamforming vector using a codebook designed for narrowband MIMO channels, described below. The feedback requirements, though, still increase in proportion to the number of subcarriers.

A MIMO-OFDM system with transmit beamforming and receive combining, using $M_t$ transmit antennas and $M_r$ receive antennas, and N subcarriers is illustrated in FIG. 1. At the transmitter 100, the k-th subcarrier modulates the symbol s(k) using the beamforming vector $w(k)=[w_1(k), w_2(k), \ldots, w_{M_t}(k)]^T$ and launches the resulting signal into the propagation environment. When the sampled impulse response of the channel is shorter than the length of the cyclic prefix, the subchannels of OFDM are separated to N narrowband channels. As shown in FIG. 2, the subchannel for the k-th subcarrier may be described by a $M_r$-by-$M_t$ matrix H(k) whose entries represent the channel gains experienced by subcarrier k. After processing with the combining vector z(k), the combined signal at subcarrier k may be expressed as $$r(k)=z^H(k)\{H(k)w(k)s(k)+n(k)\}, 1 \leq k \leq N \quad (1)$$

where n(k) is the $M_r$-dimensional noise vector with zero mean and variance $N_0$. In one embodiment, it may be assumed that the power is allocated equally across all subcarriers, thus $E[|s(k)|^2]$ is a constant and $\|w(k)\|=1$ (where means 2-norm of (·) to maintain the overall power constraints. Without loss of generality, the vector z may be such that $\|z(k)\|=1$. Then the signal to noise ratio (SNR) for subcarrier k may be written as $$\gamma(k) = \frac{E[|s(k)|^2]}{N_0} \Gamma(k) \quad (2)$$

where $\Gamma(k)=|z^H(k)H(k)w(k)|^2$ is the effective channel gain.

In the MIMO-OFDM system 100, w(k) and z(k) are designed to maximize the SNR for each subcarrier. In this invention, in one embodiment, it is assumed that the receiver 400 uses MRC given by $$z(k) = \frac{H(k)w(k)}{\|H(k)w(k)\|}. \quad (3)$$

Given w(k), MRC maximizes the SNR at the receiver 400. On the other hand, maximum ratio transmission (MRT) is considered for the transmit beamforming. MRT uses the unconstrained beamforming vector w(k) that maximizes the effective channel gain $\Gamma(k)$. With MRT and MRC, w(k) is simply the right singular vector of H(k) corresponding to the largest singular vector of H(k). See for example P. A. Dighe, R. K. Mallik, and S. S. Jamuar, "Analysis of transmit-receive diversity in Rayleigh fading," IEEE Trans. Commun., vol. 51, no. 4, pp. 694-703, Apr. 2003; and C.-H. Tse, K.-W. Yip, and T.-S. Ng, "Performance tradeoffs between maximum ratio transmission and switched-transmit diversity," in Proc. IEEE PIMRC, Sept. 2000, vol. 2, pp. 1485-1489, the subject matter of which are incorporated herein by reference in their entirety. The MRT/MRC scheme obtains full diversity order in Rayleigh fading channels and achieves the full array gain available. Unfortunately, this improved performance comes at the expense of knowledge of the complete channel impulse responses or the beamforming vectors $\{w(k), k=1,2, \ldots, N\}$. The extensive feedback used for the optimal MRT/MRC solution motivates developing new methods that achieve near maximum SNR performance but with more realistic feedback requirements.

Further Description

In the system 100, a transmit beamforming method that combines limited feedback of beamforming information and interpolation of beamforming vectors is provided. Since the length of cyclic prefix is designed to be much less than the number of subcarriers, the neighboring subchannels of OFDM is substantially correlated. In MIMO-OFDM, the beamforming vectors are determined by the corresponding subchannels and hence the beamforming vectors for the neighboring subchannels are also significantly correlated. To reduce the feedback information using the correlation, the receiver 400 selects a fraction of subcarriers and sends back the beamforming vectors only for the selected subcarriers. Then the transmitter 302 evaluates the beamforming vectors for all the subcarriers through interpolation of the conveyed beamforming vectors.

This beamforming scheme uses much less feedback information than ideal beamforming with feedback for all subcarriers, while it performs close to the ideal beamforming. This advantage is accomplished by the following processes that are used to implement the system 100:

i) spherical interpolator 305 used at the transmitter 302
ii) Determination of parameters for interpolation at the receiver 400
iii) Interpolation of beamforming vectors with quantization One Embodiment of the Spherical Interpolator 305

As shown in FIG. 3, the transmitter 302 for the MIMO-OFDM beamforming system 100 comprises a beamformer interpolator 305, a transmit beamforming unit 110, and OFDM modulators as part of the IDFT units 111.

The beamformer interpolator 305 calculates the beamforming vectors for all the subcarriers using a fraction of beamforming vectors and the parameters for interpolation, which are conveyed through the feedback channel 105. In the beamforming block 110, the symbols are mapped to transmit antennas 113 using the interpolated beamforming vectors. Finally, the mapped signals are OFDM modulated.

For one implementation, it is assumed that the transmit power is identically assigned to all subcarriers. Since the beamforming vectors have unit norm by the transmit power constraint, a spherical interpolator may be used for interpolation of beamforming vectors. For example, some spherical interpolators perform weighted averages of beamforming vectors and renormalize the result to place on the unit sphere. See, e.g. S. R. Buss and J. P. Fillmore, "Spherical averages and applications to spherical splines and interpolation," ACM Trans. Graphics, vol. 20, no. 2, pp. 95-126, Apr. 2001; K. Shoemake, "Animating rotation with quaternion curves," in Proc. SIGGRAPH'85, ACM, San Francisco, July 1985, vol. 19, pp. 245-254; G. S. Watson, Statistics on spheres, Wiley, New York, 1983, the subject matter of which is incorporated herein by reference in their entirety. However, the processes in Buss, Shoemake or Watson cannot be applied for the following reason: when w(k) is the optimal beamforming vector maximizing the effective channel gain, $e^{j\Phi}w(k)$ also maximizes the effective channel gain. In other words, the optimal beamforming vector is not a unique point but a line on the unit sphere.

In one embodiment, the spherical interpolator 305 interpolates beamforming vectors. Given $\{w(1), w(K+1), \ldots, w(N-K+1)\}$, the interpolator 305 interpolates using a vector $$\hat{w}(lK+k;\theta_l) = \frac{(1-c_k)w(lK+1)+c_k\{e^{j\theta_l}w((l+1)K+1)\}}{\|(1-c_k)w(lK+1)+c_k\{e^{j\theta_l}w((l+1)K+1)\}\|} \quad (4)$$

where $c_k=(k-1)/K$ is the linear weight value, $w(N+1)=w(1)$, $1 \leq k \leq K$, $\theta_l$ is a parameter for phase rotation with $$0 \leq l \leq \frac{N}{K}-1.$$

Refer again to FIG. 5, which illustrates the interpolator 305 as a block diagram. While conventional spherical interpolators only utilize $w(lK+1)$ and $w((l+1)K+1)$, the interpolator 305 evaluates the beamforming vector from $w(lK+1)$ and $e^{j\theta_l}w((l+1)K+1)$. The role of $\theta_l$ is to remove the distortion caused by the arbitrary phase rotation of the optimal beamforming vectors. The criteria for determining $\theta_l$ are explained below.

Determination of Parameters for Interpolation

To maximize the performance of the beamforming vectors obtained from the interpolator 305, the receiver 400 evaluates the optimal phase $$\left\{\theta_l, 0 \leq l \leq \frac{N}{K}-1\right\}$$

based on a performance metric, and conveys $\{\theta_l\}$ along with the selected beamforming vectors to the transmitter 302. At the transmitter 302, the beamforming vectors for the other subcarriers are computed by equation (4).

Suppose that the channel matrices $\{H(k), 1 \leq k \leq N\}$ are known to the receiver 400. In one system, $\{H(k), 1 \leq k \leq N\}$ may be estimated by training or pilot symbols as shown in FIG. 4. Given the subsampling rate K, the receiver 400 calculates $\{w(1), w(K+1), \ldots, w(N-K+1)\}$ using the channel matrices. In this subsection, a cost function is defined to find the optimal parameters $\{\theta_l\}$ in the sense of maximizing the minimum effective channel gain or capacity. First, the optimal solution maximizing the cost function is obtained by a numerical grid search, and then a closed-form solution is obtained through some modifications of the cost function.

Phase optimization for maximizing the minimum effective channel gain

In equation (4), $\theta_l$ is only used for computing $\{\hat{w}(lK+k), 1 \leq k \leq K\}$, and thus the optimal $\theta_l$ maximizing the minimum effective channel gain may be found by $$\theta_l = \arg\max_\theta \min\{\|H(lK+k)\hat{w}(lK+k;\theta)\|^2, 1 \leq k \leq K\} \quad (5)$$

where $$0 \leq l \leq \frac{N}{K}-1.$$

Due to the normalization factor in equation (5), it is not easy to get a closed-form solution. Instead, a numerical grid search may be used by modifying equation (5) as $$\theta_l = \arg\max_{\theta \in \Theta} \min\{\|H(lK+k)\hat{w}(lK+k;\theta)\|^2, 1 \leq k \leq K\} \quad (6)$$

where $$\Theta = \left\{0, \frac{2\pi}{P}, \frac{4\pi}{P}, \ldots, \frac{2(P-1)\pi}{P}\right\}$$

and P is the number of quantized levels which determines the performance and complexity of the search.

As an alternative to the grid search, equation (5) may be simplified by considering the average effective channel gain. In general, the subcarrier $$\left(lk+\frac{K}{2}+1\right)$$

has the minimum effective channel gain among the subcarriers $(lK+1)$ and $((l+1)K+1)$. Using this fact, equation (5) may be approximated to maximize the effective channel gain of the subcarrier $$\left(lK+\frac{K}{2}+1\right),$$

and then $\theta_l$ is obtained by $$\theta_l = \arg\max_\theta \left\|H\left(lK+\frac{K}{2}+1\right)w\left(lK+\frac{K}{2}+1\right)\right\|^2 \quad (7)$$

$$= \arg\max_\theta \frac{(w_1+e^{j\theta}w_2)^H R(w_1+e^{j\theta}w_2)}{\|w_1+e^{j\theta}w_2\|^2}$$

where $w_1=w(lK+1)$, $w_2=w((l+1)K+1)$, and $$R = H^H\left(lK+\frac{K}{2}+1\right)H\left(lK+\frac{K}{2}+1\right).$$

To find the optimal solution, the cost function is differentiated with respect to $\theta_l$ and then the optimal solution satisfies $$j\{\alpha_1 e^{j\theta}+(\alpha_2-\alpha_2^*)-\alpha_1^* e^{-j\theta}\}=0 \quad (8)$$

where $\alpha_1=(w_1^H R w_2)(w_1^H w_1+w_2^H w_2)-(w_1^H R w_1)(w_1^H w_2)-(w_2^H R w_2)(w_1^H w_2)$ and $\alpha_2=2(w_1^H R w_2)(w_2^H w_1)$. Combining $\alpha_1 e^{j\theta}$ and $\alpha_1^* e^{-j\theta}$ results in $$\text{Im}(\alpha_1 e^{j\theta}+\alpha_2)=0 \quad (9)$$

where Im(•) means the imaginary part of (•). It may be proved that there always exists θ that satisfies equation (9). Denote $\alpha_i = |\alpha_i|e^{j\Theta_i}$. Then the solutions of equation (9) are given by $$\theta_1 = -\Phi_1 + \epsilon \tag{10}$$

$$\vartheta_2 = \begin{cases} -\phi_1 + \pi - \varepsilon & \text{if } \varepsilon \geq 0 \\ -\phi_1 - \pi - \varepsilon & \text{if } \varepsilon < 0 \end{cases} \tag{11}$$

where $$\varepsilon = \sin^{-1}\left(-\frac{|\alpha_2|}{|\alpha_1|}\sin\phi_2\right).$$

Also, the derivative of equation (8) becomes $-2\operatorname{Re}(\alpha_1 e^{j\theta})$ where Re(•) means the real part of (•). Thus, the optimal $\theta_l$ maximizing the cost function is one of the solutions $\theta_1$ and $\theta_2$ such that $-2\operatorname{Re}(\alpha_1 e^{j\theta})$ is negative. This solution will be referred to as the closed-form solution.

Phase Optimization in the Sense of Maximizing Capacity $\theta_l$ may be determined to maximize the sum rate of all the OFDM subcarriers, assuming that the transmit power is identically assigned to all subcarriers. In a similar approach to maximizing the minimum effective channel gain, the optimal phase maximizing the sum rate is determined by $$\theta_l = \arg\max_{\theta} \sum_{k=1}^{K} \log_2\left\{1 + \frac{\|H(lK+k)\hat{w}(lK+k;\theta)\|^2}{N_0}\right\} \tag{12}$$

and the optimal solution is obtained by using the numerical grid search as follows.

$$\theta_l = \arg\max_{\theta \in \Theta} \sum_{k=1}^{K} \log_2\left\{1 + \frac{\|H(lK+k)\hat{w}(lK+k;\theta)\|^2}{N_0}\right\} \tag{13}$$

Using the fact that the subcarrier $$\left(lk + \frac{K}{2} + 1\right)$$

has the worst average effective channel gain, $\theta_l$ may be approximately found by $$\theta_l = \arg\max_{\theta} \log_2\left\{1 + \frac{\left\|H\left(lK + \frac{K}{2} + 1\right)\hat{w}\left(lK + \frac{K}{2} + 1;\theta\right)\right\|^2}{N_0}\right\} \tag{14}$$

By the concavity of log function, this equation is equivalent to equation (7). In other words, the closed-form solution maximizes the capacity as well as the minimum effective channel gain.

Interpolation of Beamforming Vectors with Quantization

The beamforming method for MIMO-OFDM system 100 uses the feedback of selected beamforming vectors and phase rotation parameters. To accommodate the limited bandwidth of the feedback channel, the selected beamforming vectors $\{w(1), w(K+1), \ldots, w(N-K+1)\}$ and the parameters $\{\theta_l\}$ are quantized. To quantize the beamforming vectors, the transmitter 302 and receiver 400 may use a codebook designed for narrowband MIMO systems, such as disclosed in A. Narula, M. J. Lopez, M. D. Trott, and G. W. Wornell, "Efficient use of side information in multiple-antenna data transmission over fading channels," IEEE J. Select. Areas Commun., vol. 16, no. 8, pp. 1423-1436, Oct. 1998; D. J. Love and R. W. Heath, Jr., "Equal gain transmission in multi-input multi-output wireless systems," IEEE Trans. Commun., vol. 51, no. 7, pp. 1102-1110, July 2003; D. J. Love, R. W. Heath, Jr., and T. Strohmer, "Grassmannian beamforming for multiple-input multiple-output wireless systems," IEEE Trans. Inform. Theory, vol. 49, no. 10, pp. 2735-2747, Oct. 2003; and K. K. Mukkavilli, A. Sabharwal, E. Erkip, and B. Aazhang, "On beamforming with finite rate feedback in multiple-antenna systems," IEEE Trans. Inform. Theory, vol. 49, no. 10, pp. 2562-2579, Oct. 2003, the subject matter of which are incorporated herein by reference in their entirety. The quantized beamforming vectors are in turn used to find the optimal $\theta_l$ and $\theta_l$ is uniformly quantized on $[0, 2\pi)$.

The receiver 400 quantizes the beamforming vectors by selecting the beamforming vector which maximizes the effective channel gain from the codebook as follows.

$$w_Q(lK+1) = \arg\max_{x \in W} \|H(lK+1)x\| \tag{15}$$

where W is the codebook including all possible beamforming vectors and $$0 \leq l \leq \frac{N}{K} - 1.$$

Using the quantized beamforming vectors, the receiver 400 determines the optimal phase and the transmitter 302 interpolates the beamforming vectors for all subcarriers. In a similar approach to the unquantized beamforming, $\{\theta_l\}$ are found in the sense of maximizing the minimum effective channel gain or capacity.

Phase Optimization in the Sense of Maximizing the Minimum Effective Channel Gain $\theta_l$ maximizing the minimum effective channel gain may be found in a similar approach to the unquantized case. One different point is that $\Theta_l$ is being quantized. This makes it natural to use the grid search to find the best $\theta_l$. Modifying equation (6) results in $$\theta_l = \arg\max_{\theta \in \Theta} \min\{\|H(lK+k)w_Q(lK+k;\theta)\|^2, 1 \leq k \leq K\} \tag{16}$$

where the interpolated vector $w_Q(lK+k; \theta_l)$ is given by $$w_Q(lK+k; \theta_l) = \frac{(1-c_k)w_Q(lK+1) + c_k e^{j\theta_l} w_Q((l+1)K+1)}{\|(1-c_k)w_Q(lK+1) + c_k e^{j\theta_l} w_Q((l+1)K+1)\|}. \quad (17)$$

Phase Optimization for Maximizing Capacity

As before, the interpolator 305 with quantized beamforming vectors may be optimized to maximize the sum rate of all the subcarriers. In this case, the optimal $\theta_l$ is determined by replacing $\hat{w}(lK+k; \theta)$ with $\hat{w}_Q(lK+k;\theta)$ as follows.

$$\theta_l = \arg \max_{\theta \in \Theta} \sum_{k=1}^{K} \log_2 \left\{ 1 + \frac{\|H(lK+k)\hat{w}_Q(lK+k; \theta)\|^2}{N_0} \right\}. \quad (18)$$

In this approach, the total feedback requirements per OFDM symbol become $$\frac{N}{K}(\log_2|W| + \log_2 P)$$

where |W| is the cardinality of the chosen beamforming codebook.

Overall System Summary

The MIMO-OFDM system 100 combined with transmit beamforming and receive combining may achieve the full diversity order as well as maximum array gain available. However, this approach uses the knowledge about beamforming vectors corresponding to all the subcarriers at the transmitter 302. When the uplink and downlink channel are not reciprocal, the receiver 400 sends back the channel state information in the form of beamforming vectors. To reduce the amount of feedback information, each beamforming vector may be quantized by using a codebook designed for narrowband MIMO channels. The feedback increases in proportion to the number of subcarriers.

To further reduce the feedback burdens, a transmit beamforming method combines limited feedback and beamformer interpolation. In the architecture of the system 100, the receiver 400 sends back just a fraction of information about the beamforming vectors along with the parameters for phase rotation, and the transmitter recovers the beamforming vectors for all subcarriers. In other words, the receiver 400 selects only a fraction of beamforming vectors and finds the optimal parameters for phase rotation to maximize the minimum channel gain or capacity, and conveys the information to the transmitter 302. The transmitter 302 recovers the beamforming vectors for all the subcarriers using the spherical interpolator 305. Thus, the beamforming method uses much less feedback information than the ideal beamforming with feedback of all subcarriers, while it performs close to the ideal beamforming.

A simple beamforming method to reduce the amount of information for the beamforming vectors is to combine the neighboring subcarriers into a cluster and use the beamforming vector corresponding to the center subcarrier in the cluster. This method will be referred to as clustering.

To fully exploit the diversity provided by MIMO-OFDM in non-reciprocal channels, the channel state information is sent back to the transmitter. A practical solution is to use the transmit beamforming with receive combining and convey the information about the quantized beamforming vectors using a codebook which is known to both the transmitter and receiver. Unfortunately, the feedback requirements still increase in proportion to the number of subcarriers.

As an overview to another embodiment, precoding allows the system to send multiple data streams in parallel using spatial multiplexing. This allows the high spectral efficiency of MIMI systems to be used. In spatial multiplexing, a bit stream is demultiplexed into multiple substreams, which are independently modulated and transmitted over different antennas. Linear precoding is a method of premultiplying the transmitted data streams by a matrix, chosen based on channel information, with the objective of improving the robustness of spatial multiplexing to the rank deficiencies of the channel. Precoding may be used with full channel state information or first/second order channel statistics. The precoding may be done with a limited feedback system that provides quantized channel information to the transmitter through a feedback channel, or by directly quantizing a set of precoding matrices.

In one embodiment, the system reduces the total amount of feedback by exploiting the correlation of precoding matrices on adjacent subcarriers by sending back the precoding matrices for only a fraction of the subcarriers as well as some auxiliary information. The precoders are quantized by selecting the best precoder from a codebook of precoding matrices, which depends on the performance criterion such as minimizing the mean squared error (MMSE) or maximizing the capacity. Given the quantized precoders, the transmitter reconstructs the precoding matrices for all OFDM subcarriers through a special interpolation function. To meet the orthonormality constraints, a weighted sum of the two nearest conveyed precoders may be determined and then an orthonormal projection is performed. This causes the output of the interpolator to be located in the space of candidate precoding matrices with orthonormal columns, in contrast to a standard Euclidean linear interpolator. To respect the invariance of the optimal precoder to right multiplication by a unitary matrix, a unitary derotation matrix Q is associated with precoder interpolation. Q is determined to optimize the performance of the interpolator using the same performance measure as for quantization, e.g., MMSE or capacity maximization. Because closed form optimization of Q is difficult, the Q may be selected from a finite codebook of unitary matrices, because it may be quantized to reduce feedback. The information about Q is sent back to the transmitter along with the information about the precoders for the selected subcarriers.

Figure 6:
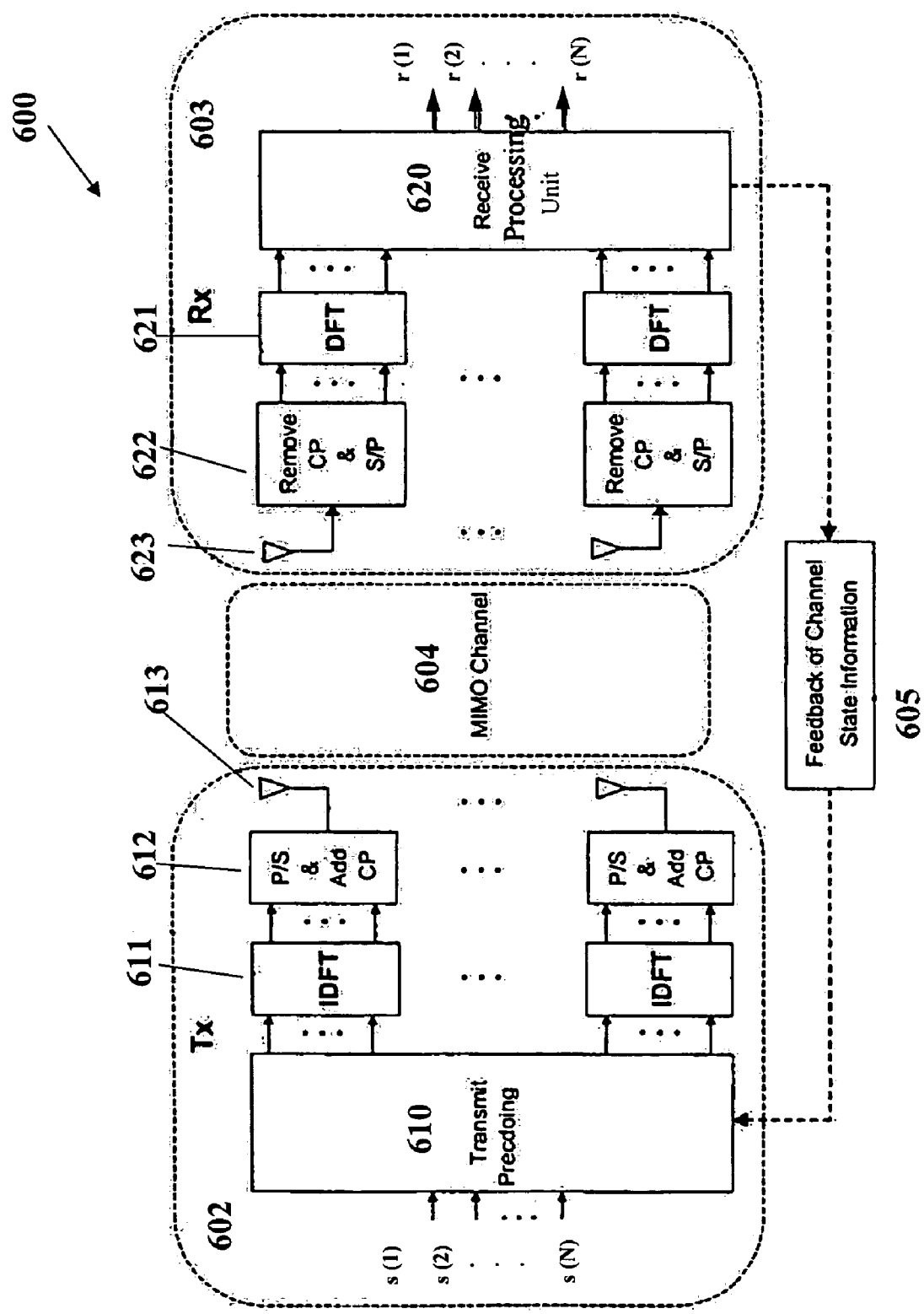
FIG. 6 is a block diagram illustrating a multiple-input multiple-output—orthogonal frequency division multiplex (MIMO-OFDM) communication system with precoding.

FIG. 6 is a block diagram illustrating a multiple-input multiple-output—orthogonal frequency division multiplex (MIMO-OFDM) communication system 600 with precoding.

The MIMO-OFDM system 600 uses precoding. The beamforming of FIG. 1 may be one embodiment of precoding. The MIMO-OFDM system 600 comprises a transmitter 602, a receiver 603, a communication channel 604, and a feedback network 605. The transmitter 802 (FIG. 8) and the receiver 900 (FIG. 9) may be used instead of the transmitter 602 and the receiver 603, respectively. The transmitter 602 comprises a precoding unit 610, a plurality of inverse discrete Fourier transform (IDFT) units 611, a plurality of parallel to serial (P/S) & ADD Cyclic prefix (CP) units 612, and a plurality of transmit antennas 613. For simplicity and clarity, only one unit 611, one unit 612, and one antenna 613 are labeled with reference numbers in FIG. 6. The receiver 603 comprises a receive processing unit 620, a plurality of discrete Fourier transform (DFT) units 621, a plurality of remove CP & serial to parallel (S/P) units 622, and a plurality of received antennas 623. For simplicity and clarity, only one receive processing unit 620, one DFT processor 621, one S/P processor 622, and one receive antenna 623 are labeled with reference numbers in FIG. 6. In an illustrative example, the MIMO-OFDM system 600 comprises $M_r$ receive antennas 623, and N subcarriers. The numbers $M_t$ and $M_r$ may be randomly chosen and N is usually set as a power of two. The communication channel 604 may be frequency selective.

In an alternative embodiment, the system 600 may be modified for use in a multiple-input single-output (MISO) system. The MISO system may have a plurality of transmit antennas 613 and a single receive antenna 623. The communication channel 604 becomes a MISO channel.

After transmit beamforming and OFDM modulation, the vectors s(1), s(2), . . . s(N) are simultaneously transmitted through $M_t$ antennas 613. At the receiver 603, the signal received through each receiver antenna 623 is demodulated by the discrete Fourier transform (DFT) processors 621 and combined to recover the transmitted vectors. The information about the vectors is conveyed to the transmitter 602 through the feedback channel 605 with limited rate. The transmitter 602 may transmit multiple data streams simultaneously.

The precoding of the transmitter 602 may be linear precoding, which premultiplies transmitted data streams by a matrix, which may be chosen based on channel information. The precoding may be based on full channel state information or first/second order channel statistics. The precoding may be based on limited feedback from the receiver 603. The precoding may include precoder quantization and further include interpolation. The precoding may use a fraction of the subcarriers, for example, based on correlation of precoding matrices on adjacent subcarriers. The precoding may use a codebook.

Figure 7:
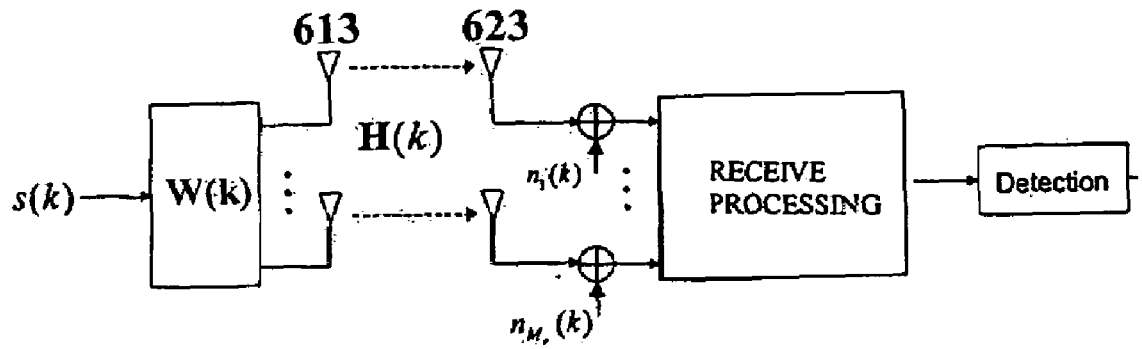
FIG. 7 is a block diagram illustrating an equivalent structure of the precoding and combining at a sub carrier k of the MIMO-OFDM communication system of FIG. 6.

FIG. 7 is a block diagram illustrating an equivalent structure of the precoding and combining at a sub carrier k of the MIMO-OFDM system 600.

Figure 8:
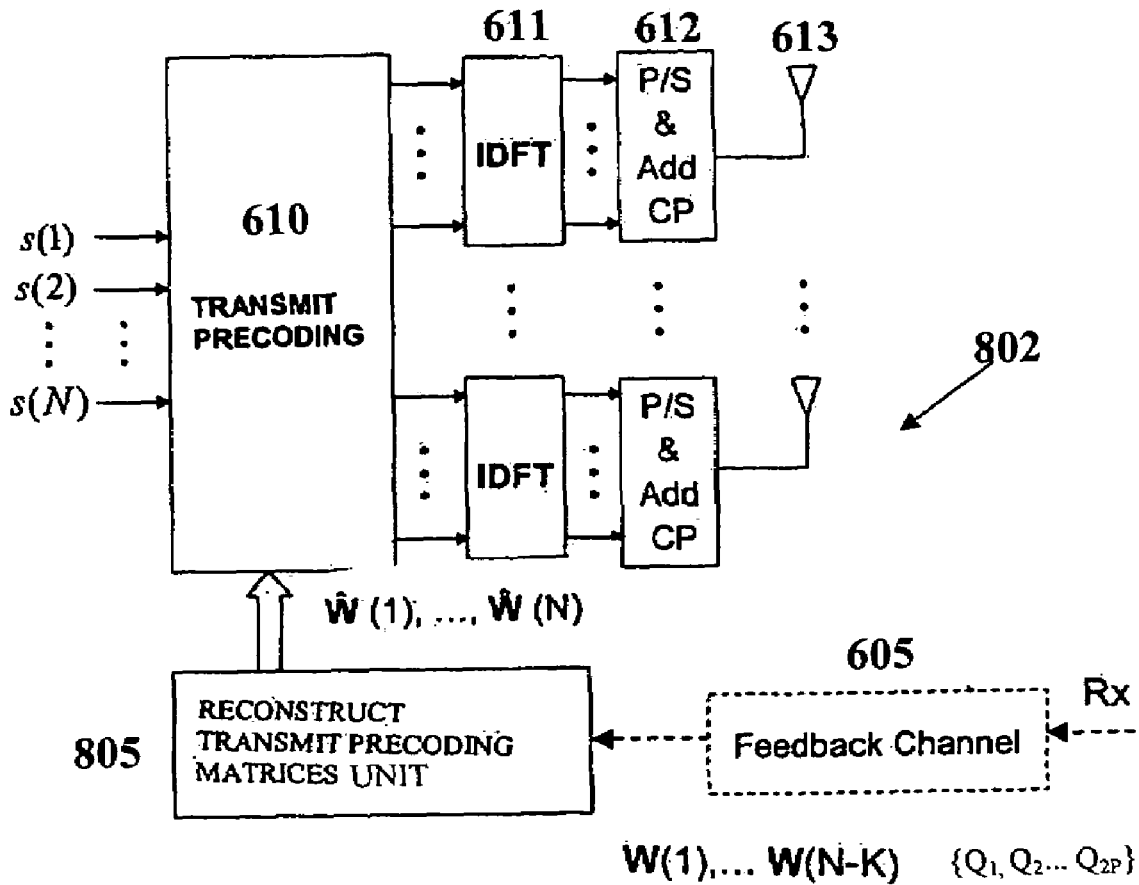
FIG. 8 is a block diagram illustrating a transmitter of the MIMO-OFDM communication system of FIG. 6.

The matrix W(k) is a matrix of the precoding of the transmitter at subcarrier k, or in other words, the output of the reconstruct unit 805 (FIG. 8). The communication channel 604 has a matrix H characteristics. The transmit precoding matrix W(k) is determined based on matrix H. The input vector s is mapped to the transmit antennas 613 by the precoding matrix W(k), and the vector output from the receiver are determined by the receive processing and detection.

The precoding matrix W(k) is a precoding matrix for the transmit precoding unit 610, the IDFT units 611, and the CP units 612.

FIG. 8 is a block diagram illustrating a transmitter 802 of the MIMO-OFDM system of FIG. 6.

The transmitter 802 is similar to the transmitter 602 (FIG. 6) but includes a reconstruct transmit precoding matrices unit 805. The transmitter 802 calculates the precoding matrix for all the subcarriers using a fraction of vectors and the parameters for interpolation, which are available from the feedback channel 605 which the unit 805 performs. The remaining blocks are the same as those for the MIMO-OFDM system 600 (FIG. 6). The operation of the transmitter 802 is described in more detail below.

Figure 9:
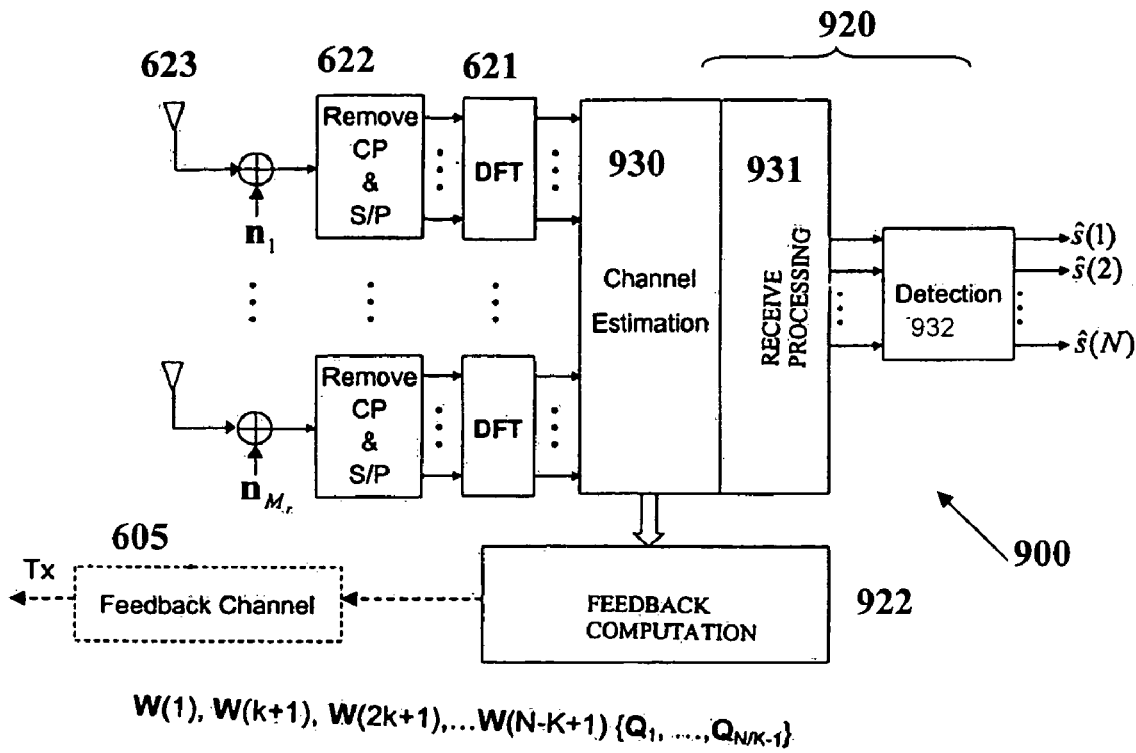
FIG. 9 is a block diagram illustrating a receiver of the MIMO-OFDM s communication system of FIG. 6.

FIG. 9 is a block diagram illustrating a receiver 900 of the MIMO-OFDM system 600 of FIG. 6.

The receiver 900 may be used instead of the receiver 603 in the system 600. The receiver 900 is similar to the receiver 603 but includes a receiving combining unit 920, and a feedback computation unit 922. The receive combining unit 920 comprises a channel estimator 930, a receive processing unit 931, and a detector 932. After OFDM demodulation, the received signals from the Mr antennas 623 and N subcarriers are used for channel estimation. The receive processing unit 631 recovers the transmitted vectors for each subcarrier separately from the combined signals. Using the estimated channel information, the feedback vectors used at the transmitter 802 are computed. The detector 932 may be, for example, a linear detector, a non-linear detector, a linear equalizer, a maximum likelihood sequencing detector, MMSE, a sphere decoder or other detectors well known in the art.

The receiver 900 subsamples the subcarriers, e.g., selects a fraction of subcarriers, and selects the corresponding vectors. In addition, the receiver 900 finds the parameters for the precoding interpolation. The vectors are sent back to the transmitter 902 along with the parameters through the feedback channel 605. In another embodiment, the receiver 900 samples the subcarriers nonuniformly.

Figure 10:
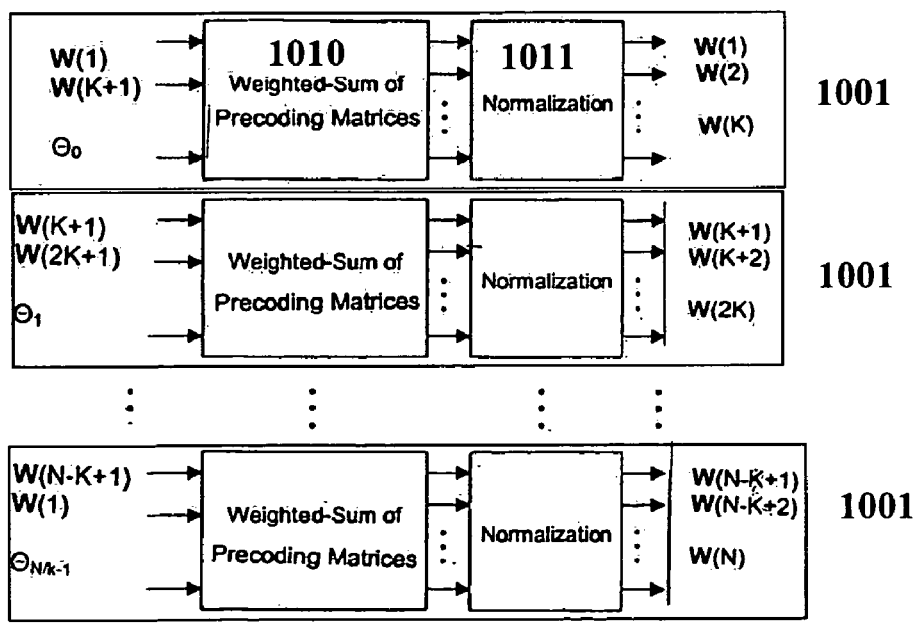
FIG. 10 is a block diagram illustrating a precoding scheme of the MIMO-OFDM communication system of FIG. 6.

FIG. 10 is a block diagram illustrating the reconstruct transmit precoding matrices unit 805. The unit 805 may be similar to the interpolator 305, but operates on vectors to form the interpolation for the precoding matrix W. The precoding matrix W is computed by blockwise interpolation in a plurality of interpolators 1001. Each interpolator 1001 includes a weighted sum unit 1010 and a normalization unit 1011. In a first interpolator 1001, the matrices W(2) to W(K) are obtained from W(1) and W(K+1), and $Q_0$. Generally, W(lK+2) to W((l+1)K) are obtained from, W(lK+1) to W((l+1)K+1) and Qi. Using the periodicity of DFT, W(N-K+1), W(1) (=W(N+1))(N-K+2), and $Q_{(N/K)-1}$ are used to evaluate W(N-K+1) to W(N) in the last interpolator 1001. The interpolated precoding matrix W are used for the transmit precoding in the transmitter 802 (FIG. 8.)

The system 600 has a tone model:

$$Y(k)=H(k)W(k)s(k)+v(k), \quad (19)$$

where H(k), W(k), and s(k) are described above in conjunction with FIGS. 6-10, and v(k) are the vectors received at the receiver antenna 623. In one embodiment, W(k) is an element of a set of a finite codebook.

The code words may be chosen based on a desired performance metric, such as mean squared error (MSE) or mutual information. In one embodiment, the precoding is quantized precoding with a finite search.

In another embodiment, the precoding is Grassmannian precoding. This may provide optimal packing of the codebook. Further, the distance measures may depend on precoding criteria, such as projection 2-norm for MMSE with trace, or Fubini-Study distance for capacity and MMSE with determinant. The Grassmannian precoding may minimize the bound on average distortion in Rayleigh channels.

In another embodiment, the precoding may use clustering to reduce feedback. Such precoding uses the coherence bandwidth of the channel. For example, every Kth precoding matrix may be uses, and the same precoding matrix per cluster may be used. This may cause some performance degradation at the cluster boundary.

The transmitter uses subsampling and interpolation for the precoding matrices.

The W(k) matrix may have columns that are orthogonal or $W(k)^H W(k)=1/M\, I_M$ for non-Euclidean interpolation.

One solution is a simple first order linear interpolation which results in $$Z(l\,K+k)=(1-C_k)W(lK+k)+c_k W((l+1)K+1) \quad (20)$$

and $$\hat{W}(l\,K+k)=Z(l\,K+k)\{Z^H(lK+k)Z(lK+k)\}^{-1/2} \quad (21)$$

with $c_k=(k-1)/K$. The $\hat{W}(lK+k)$ is the interpolated precoding.

This may produce nonuniqueness of precoders. There may be a performance invariant to the right multiplication of the orthogonal matrix. For example, MSE (W(k), H (k))=MSE (W(k)Q, H (k)). The nonuniqueness may result in interpolation problems.

In one embodiment, a derotated interpolation may be used. Such derotated interpolation follows $$Z(l\,K+k)=(1-c_k)\,W(lK+k)+c_k W((l+1)K+1)Q_1 \quad (22)$$

Where $Q_1$ is a M×M unitary matrix.

The rotation may be optimized over a finite set $$\theta=\{Q_1, Q_2, \ldots Q_{2P}\} \quad (23)$$

to enable limited feedback. A uniform set of unitary matrices may be used.

The MMSE with trace solves $$Q_1 = \arg\min\max \operatorname{tr}(\mathrm{MSE}(\hat{W}(lK+k;\,Q')\text{ with }Q'\in\theta\text{ and }k=0\ldots K-1. \quad (24)$$

One method for interpolation includes a first quantization step and a second optimization step. In the first step, $\{W(lK)\}$ for I=0 to [N/K] −1 is quantized. In the second step, $\{Q_1\}$ for l=0 to [N/K]−1 is optimized. The feedback bits use $$\text{precoding matrices } [N/K]\log_2|W| \quad (25)$$

and $$\text{derotation matrices}[N/K]\log_2|\theta| \quad (26)$$

In one embodiment, the system 100 or 600 may be a time-divisional duplex system. The feedback may be determined from channel reciprocity. In one embodiment, channel reciprocity uses the receive channel to infer the transmit channel.

The code book may be generated, for example, from quantized parameters for Givens rotations or mutually unbiased bases (MUB). The code book of unitary matrices θ may be generated based on the probability distribution of equation (24) or an estimate of the distribution, such as isotropically random. In the example of an isotropically random distribution, the unitary matrices θ may be selected so that they are uniformly distributed in the space of unitary matrices.

In one embodiment, the matrices θ may be formed by forming a set of orthogonal bases (ONB) such that the maximal correlation between elements of different ONBs is minimum and equal to $1/M_s$. Two (or more) ONBs, $\{x_i\}_{i=1}^{M_s}$ and $\{y_i\}_{i=1}^{M_s}$ are said to be mutually unbiased bases (MUB) if they satisfy:

$$|x_i^H y_j| = \frac{1}{M_s},\ i=1,\ldots,M_s;\ j=1,\ldots,M_s. \quad (26)$$

Each ONM represents a unitary matrix, an element of θ. The matrices θ may be designed for an arbitrary $M_s$ and cardinality. The unitary matrices may be parameterized and then the parameter space is quantized. The parameterizations may be obtained by decomposing a unitary matrix into Givens rotations. A unitary matrix $Q\in C^{M_s\times M_s}$ can be decomposed as $$Q = \left[\prod_{k=1}^{M_s} D_k(\phi_{k,k},\ldots,\phi_{k,M_s})\prod_{l=1}^{M_s-k} G_{M_s-l,M_s-l+1}(\theta_{k,l})\right]I_{M_s} \quad (27)$$

where the $M_s$ dimensional diagonal matrix $$D_k(\phi_{k,k},\ldots,\phi_{k,M_s})=\operatorname{diag}(1_{k-1},e^{j\Phi_{k,k}},\ldots,e^{j\Phi_{k,M_s}}), \quad (28)$$

$1_{k-1}$ is (k−1) 1's, $G_{p-1,p}(\theta)$ is the Givens matrix which operates in the (p−1, p) coordinate plane of the form $$G_{p-1,p}(\theta) = \begin{bmatrix} I_{p-2} & & & \\ & \cos(\theta) & -\sin(\theta) & \\ & \sin(\theta) & \cos(\theta) & \\ & & & I_{M_s-p} \end{bmatrix}. \quad (29)$$

The parameterization becomes a unitary matrix $Q\in C^{M_s\times M_s}$ into $M_s^2$ parameters $\{\varnothing_{k,j},\theta_{k,l}\}$. Further, in case the unitary matrix is isotropically random, the distributions of the parameters are given by the following.

For a Q that is isotropically random, the parameters $\{\varnothing_{km},\theta_{k,\cdot}\}$ are independent. Moreover, $\varnothing_{k,j}$ is uniformly distributed over $(-\pi,\pi]$ for all kj and $\theta_{k,l}$ has probability density $$p(\theta_{k,l})=2l\sin^{2l-1}\theta_{k,l}\cos\theta_{k,l},\ 0\leq\theta_{k,l}<\pi/2. \quad (30)$$

Further a method to quantize the unitary matrices is to do independent scaler quantization of the parameters $\{\varnothing_{k,j},\theta_{kj}\}$ with squared error distortion metric. An adhoc approach is to allocate R bits to the different parameters equally. The parameters $\{\varnothing_{k,j}\}$ are quantized uniformly and the reconstruction points $\{\hat{\phi}_{k,j}\}$ have closed form expressions. In some cases, quantization of $\{\theta_{k,l}\}$ leads to closed form expressions for the re-construction points (for example $M_s$=2 and 1-bit quantization of $\theta_{1,1}$). A general method is to use standard processes for vector quantizer design, for example, a Lloyd algorithm to jointly determine the reconstruction points for all the parameters $\{\hat{\phi}_{k,j},\hat{\theta}_{k,l}\}$. The codebook of unitary matrices, θ is designed by reconstructing unitary matrices from the quantized parameters $\{\hat{\phi}_{k,j},\hat{\theta}_{k,l}\}$.

The MIMO-OFDM systems 100 and 600 may be used, for example, for wireless indoor communication systems, such as IEEE 802.16 standard systems, IEEE 802.11n standard wireless LANs, and IEEE 802.20 standard Mobile Broadband Wireless Access (MBWA) systems, or used for other systems, such as 4G wireless cellular systems.

What is claimed:

1. A communication apparatus, comprising:
    a plurality of antennas; and
    a transmitter coupled to the antennas and configured to provide to the antennas a plurality of output signals on a plurality of subcarriers for transmission to a receiver of another communication apparatus, wherein:
    the transmitter is configured to provide the output signals in response to a plurality of input signals and limited feedback information;
    the transmitter is configured to receive the limited feedback information from the receiver;
    the limited feedback information includes interpolation information and beamforming vectors for a subset of the subcarrriers;
    the transmitter is configured to derive beamforming vectors for at least one subcarrier of the plurality of subcarriers not included in the subset based at least on an interpolation of the beamforming vectors for a subset of the subcarriers;
    the interpolation is based at least in part on the interpolation information; and
    the interpolation information includes phase values.

2. The communication apparatus of claim 1, wherein the transmitter is configured to use precoding to generate the plurality of output signals based on the limited feedback information.

3. The communication apparatus of claim 1, wherein the transmitter is configured to use beamforming to generate the plurality of output signals based at least on the limited feedback information.

4. The communication apparatus of claim 1, wherein the transmitter is configured to use interpolation to generate the plurality of output signals based at least on the limited feedback information.

5. The communication apparatus of claim 1, wherein the transmitter is configured to use interpolation to generate precoding matrices based at least on the limited feedback information, and wherein the transmitter is configured to generate the output signals using the precoding matrices.

6. The communication apparatus of claim 1, wherein the transmitter is configured to use interpolation to generate a precoding matrix based at least on the limited feedback information and to generates all of the plurality of output signals using the precoding matrix.

7. The communication apparatus of claim 1, wherein the limited feedback information is indicative of a state of a communication channel between the transmitter and the receiver over which the plurality of output signals are communicated.

8. The communication apparatus of claim 1, wherein the transmitter is configured to use precoding to generate the plurality of output signals based on a derotated interpolation of the limited feedback information.

9. The communication apparatus of claim 8, wherein the derotated interpolation uses a precoding matrix and a rotation based on an optimization of unitary matrices over a finite set.

10. The communication apparatus of claim 1, wherein the transmitter comprises an interpolator configured to use a complex phase rotation for phase rotation on the provided beamforming vectors, and wherein the phase values comprise phase rotation values.

11. The communication apparatus of claim 10, wherein the interpolator is configured to use a phase that is quantized for the beamforming vectors associated with a subset of the plurality of subcarriers.

12. The communication apparatus of claim 11, wherein the interpolator is configured to quantizes the beamforming vectors associated with a subset of the plurality of subcarriers using a code book.

13. The communication apparatus of claim 11, wherein the interpolator is configured to use linear interpolation.

14. The communication apparatus of claim 11, wherein the interpolator is configured to use non-linear interpolation.

15. The communication apparatus of claim 11, wherein the interpolator is a spherical interpolator.

16. The communication apparatus of claim 15, wherein the spherical interpolator is configured to use derotation.

17. The communication apparatus of claim 11, wherein the interpolator is configured to use a-one of the beamforming vectors for a group of adjacent subcarriers.

18. The communication apparatus of claim 1, wherein the transmitter is configured to generate the beamforming vectors using equation $$\hat{w}(1K+k;\theta_1) = \frac{(1-c_k)w(1K+1) + c_k\{e^{j\theta_1}w((1+1)K+1)\}}{\|(1-c_k)w(1K+1) + c_k\{e^{j\theta_1}w((1+1)K+1)\}\|}$$

wherein $c_k=(k-1)/K$ is the linear weight value, $w(N+1)=w(1)$, $1 \leq k \leq K$, and $\theta_1$ is a parameter for phase rotation with $$0 \#1 < -\frac{N}{K} - 1.$$

19. A communication apparatus, comprising:
one or more antennas; and
a receiver coupled to the one or more antennas and configured to receive a plurality of output signals on a plurality of subcarriers from a transmitter of another communication apparatus, wherein:
the receiver is configured to provide decoded signals from the received signals, and to determine and provide beamforming vectors and interpolation parameters to the transmitter;
the beamforming vectors are associated with a subset of the plurality of subcarriers;
the interpolation parameters are for the transmitter to use in conjunction with the provided beamforming vectors associated with a subset of the plurality of subcarriers to derive beamforming vectors for the at least one of the plurality of subcarriers not included in the subset; and
the receiver is configured to subsamples the plurality of subcarriers, selects a portion of the plurality of subcarriers, and generates the interpolation parameters from the beamforming vectors associated with a subset of the plurality of subcarriers.

20. The communication apparatus of claim 19, wherein the interpolation parameters include phase values, and the transmitter is configured to use a phase rotation to derive the beamforming vectors for the at least one subcarrier of the plurality of subcarriers.

21. The communication apparatus of claim 20, wherein the transmitter is configured to use phase rotation to reduce distortion in the interpolation of the beamforming vectors.

22. The communication apparatus of claim 20, wherein the phase rotation satisfies a closed-form solution.

23. The communication apparatus of claim 19, wherein the receiver is configured to determine the limited feedback information from channel quantization.

24. The communication apparatus of claim 19, wherein the receiver is configured to communicate with the transmitter in a time-division duplex system and to determine the limited feedback information from channel reciprocity.

25. A communication apparatus, comprising:
one or more antennas; and
a receiver coupled to the one or more antennas and configured to receive, from a transmitter of another communication apparatus, a plurality of first signals through orthogonal frequency division multiplexing on a plurality of subcarriers;
wherein the receiver is configured to receives the plurality of first signals, provides decoded signals indicative of the plurality of first signals, and provides precoding vectors for a plurality of the subcarriers and interpolation parameters for the transmitter to derive precoding vectors for at least one of the plurality of subcarriers not included in the subset based at least on interpolation of the precoding vectors;
wherein the interpolation is based at least in part on the interpolation parameters; and
the interpolation information includes phase values.

26. The communication apparatus of claim 25, wherein the precode matrix reconstruct unit is configured to use the precoding matrix for a group of adjacent subcarriers.

27. The communication apparatus of claim 25, wherein the receiver is configured to generate channel information is-based on channel reciprocity.

28. A communication apparatus, comprising:
a plurality of antennas; and
a transmitter coupled to the plurality of antennas and configured to provide orthogonal frequency division multiplexing to a plurality of first signals and to provide the plurality of first signals on a plurality of subcarriers for output to a receiver of another communication apparatus, wherein:
the transmitter includes a precode matrix reconstruct unit configured to provide precoding matrices based on channel information received from the receiver of the other communication apparatus;
the channel information includes precode vectors for a subset of the plurality of subcarriers and interpolation parameters for deriving precode vectors from at least one of the plurality of subcarriers not included in the subset
the precode matrix reconstruct unit is configured to derive precode vectors for the at least one of the plurality of subcarriers not included in the subset in response to the provided precode vectors;
the derivation is based at least on interpolation of the precode vectors;
the interpolation is based at least in part on the interpolation parameters; and
the receiver is configured to subsamples the plurality of subcarriers, selects the subset, evaluates the precoding vectors corresponding to the subset, and generates interpolation parameters from the evaluated precoding vectors.

29. The communication apparatus of claim 28, wherein the precode matrix reconstruct unit is configured to perform a matrix multiplication on the precoding vectors.

30. The communication apparatus of claim 29, wherein the matrix multiplication reduces distortion in the interpolation of the precoding vectors of the subset.

31. The communication apparatus of claim 29, wherein the matrix multiplication satisfies a closed-form solution.

32. The communication apparatus of claim 28, wherein the precode matrix reconstruct unit is configured to use a unitary matrix for matrix multiplication on the precoding vectors of the subset.

33. The communication apparatus of claim 28, wherein the precode matrix reconstruct unit is configured to use a phase quantized for the precoding vectors of the subset.

34. The communication apparatus of claim 28, wherein the precode matrix reconstruct unit is configured to quantizes the matrix using a code book.

35. The communication apparatus of claim 28, wherein the precode matrix reconstruct unit is configured to uses linear interpolation.

36. The communication apparatus of claim 28, wherein the precode matrix reconstruct unit is configured to uses non-linear interpolation.

37. The communication apparatus of claim 28, wherein the precode matrix reconstruct unit is configured to generate the precoding matrix $\hat{W}$ using equations $$W(k)^H W(k) = 1/M I_M;$$

$$Z(lK+k) = (1-c_k)W(lK+k) + c_k W((l+1)K+1)$$

and $$\hat{W}(lK+k) = Z(lK+k)\{Z^H(lK+k)Z(lK+k)\}^{-1/2}$$

where $c_k = (k-1)/K$.

38. The communication apparatus of claim 28, wherein the precode matrix reconstruct unit is configured to interpolate on a Grassmann manifold.

39. The communication apparatus of claim 38, wherein the precode matrix reconstruct unit is configured to uses derotation.

40. The method for a communication apparatus to transmit finals to another communication apparatus using a plurality of subcarriers, comprising:
receiving, by a transmitter of the communication apparatus, limited feedback information, wherein the limited feedback information is received from a receiver of the other communication apparatus, wherein the limited feedback information includes beamforming vectors for a subset of subcarriers and interpolation information for deriving beamforming vectors for at least one of the plurality of subcarriers from the beamforming vectors;
deriving, by the transmitter, the beamforming vectors for at least one of the plurality of subcarriers not included in the subset b interpolating the beamforming vectors for the subset of subcarriers using the interpolation parameters;
receiving, by the transmitter, a plurality of input signals; and
providing, by the transmitter, a plurality of output signals on the plurality of subcarriers for transmission to the receiver, wherein at least one of the plurality of output finals is provided based at least on at least one of the plurality of input signals and the derived beamforming vector for the at least one of the plurality of subcarriers,
wherein the interpolating comprises using phases values provided as part of the limited feedback information.

41. A method for a communication apparatus to receive signals from another communication apparatus using a plurality of subcarriers, comprising:
receiving, by a receiver of the communication apparatus from a transmitter of the another communication apparatus, a plurality of signals on a plurality of subcarriers;
decoding the received plurality of signals by the receiver;
generating, by the receiver, a plurality of beamforming vectors for a subset of the plurality of subcarriers and interpolation parameters for the transmitter to derive, from the plurality of beamforming vectors for a subset of the plurality of subcarriers, beamforming vectors for at least one of the plurality of subcarriers not included in the subset; and
providing, by the receiver to the transmitter, the beamforming vectors for a subset of the plurality of subcarriers and the interpolation parameters;
wherein the interpolation parameters include phase values.

42. A method for a communication apparatus to transmit signals to another communication apparatus using a plurality of subcarriers, comprising:
receiving, by a transmitter of the communication apparatus, limited feedback information, wherein the limited feedback information is received from a receiver of the other communication apparatus, and wherein the limited feedback information includes interpolation information and precoding vectors for a subset of subcarriers;
deriving, by the transmitter, the precoding vectors for the at least one subcarrier of the plurality of subcarriers not included in the subset by interpolating the provided precoding vectors for a subset of subcarriers using the interpolation parameters;

receiving a plurality of input signals by the transmitter; and providing, by the transmitter, a plurality of output signals on the plurality of subcarriers for transmission to the receiver, wherein at least one of the plurality of output finals is provided in response to at least one of the plurality of input signals and the derived precoding vectors, the limited feedback information comprises phase values.

43. A method for a communication apparatus to receive signals from another communication apparatus using a plurality of subcarriers, comprising:

receiving, by a receiver of the communication apparatus from a transmitter of the another communication apparatus, a plurality of signals on a plurality of subcarriers;

decoding the receiver;

generating, by the receiver, a plurality of precoding vectors for a subset of the plurality of subcarriers and interpolation parameters for the transmitter to derive, from the precoding vectors for a subset of the subcarriers, precoding vectors for at least one of the plurality of subcarriers not included in the subset; and providing, by the receiver to the transmitter, the precoding vectors for a subset of the plurality of subcarriers and the interpolation parameters;

wherein the interpolation parameters include phase values.

* * * * *

UNITED STATES PATENT AND TRADEMARK OFFICE
CERTIFICATE OF CORRECTION

PATENT NO. : 7,676,007 B1
APPLICATION NO. : 11/188233
DATED : March 9, 2010
INVENTOR(S) : Jihoon Choi It is certified that error appears in the above-identified patent and that said Letters Patent is hereby corrected as shown below:

Col. 17 Lines 20-21: "limited feedback information and to generates all" should read -- limited feedback information and to generate all --
Col. 17 Lines 56-57: "wherein the interpolator is configured to use a-one of the beamforming" should read -- wherein the interpolator is configured to use one of the beamforming --
Col. 18 Line 26: "the receiver is configured to subsamples" should read -- the receiver is configured to subsample --
Col. 18 Line 27: "subcarriers, selects a portion" should read -- subcarriers, select a portion --
Col. 18 Line 28: "and generates the interpolation" should read -- and generate the interpolation --
Col. 18 Line 57: "wherein the receiver is configured to receives" should read -- wherein the receiver is configured to receive --
Col. 18 Line 58: "of first signals, provides decoded" should read -- of first signals, provide decoded --
Col. 18 Line 59: "the plurality of first signals, and provides precoding" should read -- the plurality of first signals, and provide precoding --
Col. 19 Lines 5-6: "generate channel information is based on" should read -- generate channel information based on --
Col. 19 Line 23: "subset" should read -- subset; --
Col. 19 Line 32: "the receiver is configured to subsamples the plurality" should read -- the receiver is configured to subsample the plurality --
Col. 19 Line 33: "subcarriers, selects the subset, evaluates the precoding" should read -- subcarriers, select the subset, evaluate the precoding --
Col. 19 Line 34: "vectors corresponding to the subset, and generates" should read -- vectors corresponding to the subset, and generate --
Col. 19 Line 54: "precode matrix reconstruct unit is configured to quantizes" should read -- precode matrix reconstruct unit is configured to quantize --
Col. 20 Line 11: "The method" should read -- A method --
Col. 20 Line 12: "finals to another communication" should read -- signals to another communication --
Col. 20 Line 25: "the subset b interpolating" should read -- the subset by interpolating --
Col. 20 Line 33: "finals is provided based at least" should read -- signals is provided in response --
Col. 20 Line 36: "wherein the interpolating comprises using phases values" should read -- wherein the interpolating comprises using phase values --
Col. 21 Line 8: "finals is provided in response" should read -- signals is provided in response --

Signed and Sealed this

Twenty-fifth Day of May, 2010

David J. Kappos
*Director of the United States Patent and Trademark Office*

Col. 21 Line 10: "the limited feedback information" should read -- wherein the limited feedback information --

Col. 22 Line 1: "decoding the receiver;" should read -- decoding the plurality of the signals by the receiver; --